US012752524B2

(12) United States Patent
Brook et al.

(10) Patent No.: US 12,752,524 B2
(45) Date of Patent: Oct. 6, 2026

(54) MANUFACTURING A CONDUCTIVE TRANSFER

(71) Applicant: CONDUCTIVE TRANSFERS LIMITED, Barnsley (GB)

(72) Inventors: Paul Timothy Brook, Barnsley (GB); Mark John Catchpole, Saxmundham (GB); Steven Paul Sutcliffe, Rotherham (GB)

(73) Assignee: INTERLINK ELECTRONICS, INC., Fremont, CA (US)

( * ) Notice: Subject to any disclaimer, the term of this patent is extended or adjusted under 35 U.S.C. 154(b) by 0 days.

(21) Appl. No.: 18/877,583

(22) PCT Filed: Jun. 20, 2023

(86) PCT No.: PCT/GB2023/000034
§ 371 (c)(1),
(2) Date: Dec. 20, 2024

(87) PCT Pub. No.: WO2023/247911
PCT Pub. Date: Dec. 28, 2023

(65) Prior Publication Data

US 2025/0229519 A1 Jul. 17, 2025

(30) Foreign Application Priority Data

Jun. 20, 2022 (GB) ...................................... 2209045

(51) Int. Cl.
*B32B 37/00* (2006.01)
*B32B 7/06* (2019.01)
(Continued)

(52) U.S. Cl.
CPC .............. *B32B 37/025* (2013.01); *B32B 7/06* (2013.01); *B32B 7/12* (2013.01); *B32B 27/08* (2013.01);
(Continued)

(58) Field of Classification Search
CPC ................................................ B32B 2307/202
See application file for complete search history.

(56) References Cited

U.S. PATENT DOCUMENTS

2018/0117895 A1* 5/2018 Brook .................. H05K 1/0283
2019/0283386 A1 9/2019 Brook et al.

FOREIGN PATENT DOCUMENTS

GB 2591454 A 8/2021
WO 2022043672 A1 3/2022

* cited by examiner

*Primary Examiner* — Ian A Rummel
(74) *Attorney, Agent, or Firm* — Maschoff Brennan

(57) ABSTRACT

A method of manufacturing a conductive transfer, comprises the step of printing a non-conductive ink onto a release film to produce a first non-conductive ink layer and curing the first non-conductive ink layer. The method comprises printing an electrically conductive ink onto the first non-conductive ink layer to produce an electrically conductive ink layer and curing the electrically conductive ink layer; and printing a non-conductive ink over the electrically conductive layer to produce a second non-conductive ink layer and curing the second non-conductive ink layer. An adhesive material is printed over the second non-conductive ink layer to produce an adhesive layer and the adhesive layer is cured. The release film comprising the first non-conductive ink layer, electrically conductive ink layer, second non-conductive ink layer and adhesive layer is applied to a first substrate and at least one of heat or pressure is applied to the first substrate and release film such that the adhesive layer adheres to said first substrate. The first substrate comprises a thermoplastic polymer.

18 Claims, 12 Drawing Sheets

(51) Int. Cl.
*B32B 7/12* (2006.01)
*B32B 27/08* (2006.01)
*B32B 27/36* (2006.01)
*B32B 27/40* (2006.01)

(52) U.S. Cl.
CPC ............ *B32B 27/365* (2013.01); *B32B 27/40* (2013.01); *B32B 2307/202* (2013.01); *B32B 2307/206* (2013.01); *B32B 2307/412* (2013.01); *B32B 2457/00* (2013.01)

MANUFACTURING A CONDUCTIVE TRANSFER

CROSS REFERENCE TO RELATED APPLICATIONS

This application claims priority from United Kingdom Patent Application number GB 22 09 045.0, filed on 20 Jun. 2022, the whole contents of which are incorporated herein by reference.

TECHNICAL FIELD

The present invention relates to a method of manufacturing a conductive transfer and a conductive transfer comprising a substrate comprising a thermoplastic polymer.

BACKGROUND OF THE INVENTION

Transfer printing is traditionally used to allow printed images and designs to be applied to available surfaces, including wearable items and surfaces of articles made from fabrics, plastics or wood.

The present applicant has developed technology in the field of conductive transfers which adapt processes in transfer printing to produce conductive transfers which can be utilised to form electronic products with increased functionality.

Conventional transfers produced from printing involve a process in which a number of printed layers are printed directly onto a substrate or other fabric. For transfers with a large number of layers, the substrate or fabric must be able to withstand repeated applications of printing thereon and the subsequent curing and drying each ink layer requires. As part of this process, each printed ink layer is typically processed through a curing machine which applies heat to cure and dry the ink at an appropriate rate. This consequently limits the choice of materials which are suitable for a substrate of such a transfer.

Thermoplastic polymers are known to be used for substrates. They are not suitable for conductive transfers having increased functionality as these types of transfers require a large number of printed layers. Consequently, with each repeated curing and drying process for each layer, a thermoplastic polymer substrate repeatedly melts and solidifies thereby increasing in overall hardness with each layer and losing its flexibility and functionality.

BRIEF SUMMARY OF THE INVENTION

According to a first aspect of the present invention, there is provided a method of manufacturing a conductive transfer, comprising the steps of: a method of manufacturing a conductive transfer, comprising the steps of: printing a non-conductive ink onto a release film to produce a first non-conductive ink layer; curing said first non-conductive ink layer; printing an electrically conductive ink onto said first non-conductive ink layer to produce an electrically conductive ink layer; curing said electrically conductive ink layer; printing said non-conductive ink over said electrically conductive ink layer to produce a second non-conductive ink layer; curing said second non-conductive ink layer; printing an adhesive material over said second non-conductive ink layer to produce an adhesive layer; curing said adhesive layer; applying said release film comprising said first non-conductive ink layer, said electrically conductive ink layer, said second non-conductive ink layer and said adhesive layer to a first substrate; and applying at least one of heat or pressure to said first substrate and said release film such that said adhesive layer adheres to said first substrate; wherein said first substrate comprises a thermoplastic polymer, and is attached to said conductive transfer, following said step of applying at least one of heat and pressure, to provide an outer surface for said conductive transfer.

According to a second aspect of the present invention, there is provided a conductive transfer attached to a first substrate, said conductive transfer comprising: a first non-conductive ink layer and a second non-conductive ink layer; an electrically conductive ink layer positioned between said first non-conductive ink layer and said second non-conductive ink layer; and an adhesive layer; said first non-conductive layer, said second non-conductive layer, said electrically conductive ink layer and said adhesive layer are applied to a release film; wherein said first non-conductive layer, said second non-conductive layer, said electrically conductive ink layer and said adhesive layer are further applied to said first substrate to provide an outer surface for said conductive transfer, and said first substrate comprises a thermoplastic polymer.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as “first” and “second” do not necessarily define an order or ranking of any sort.

DETAILED DESCRIPTION OF EMBODIMENTS OF THE INVENTION

FIG. 1

Figure 1:
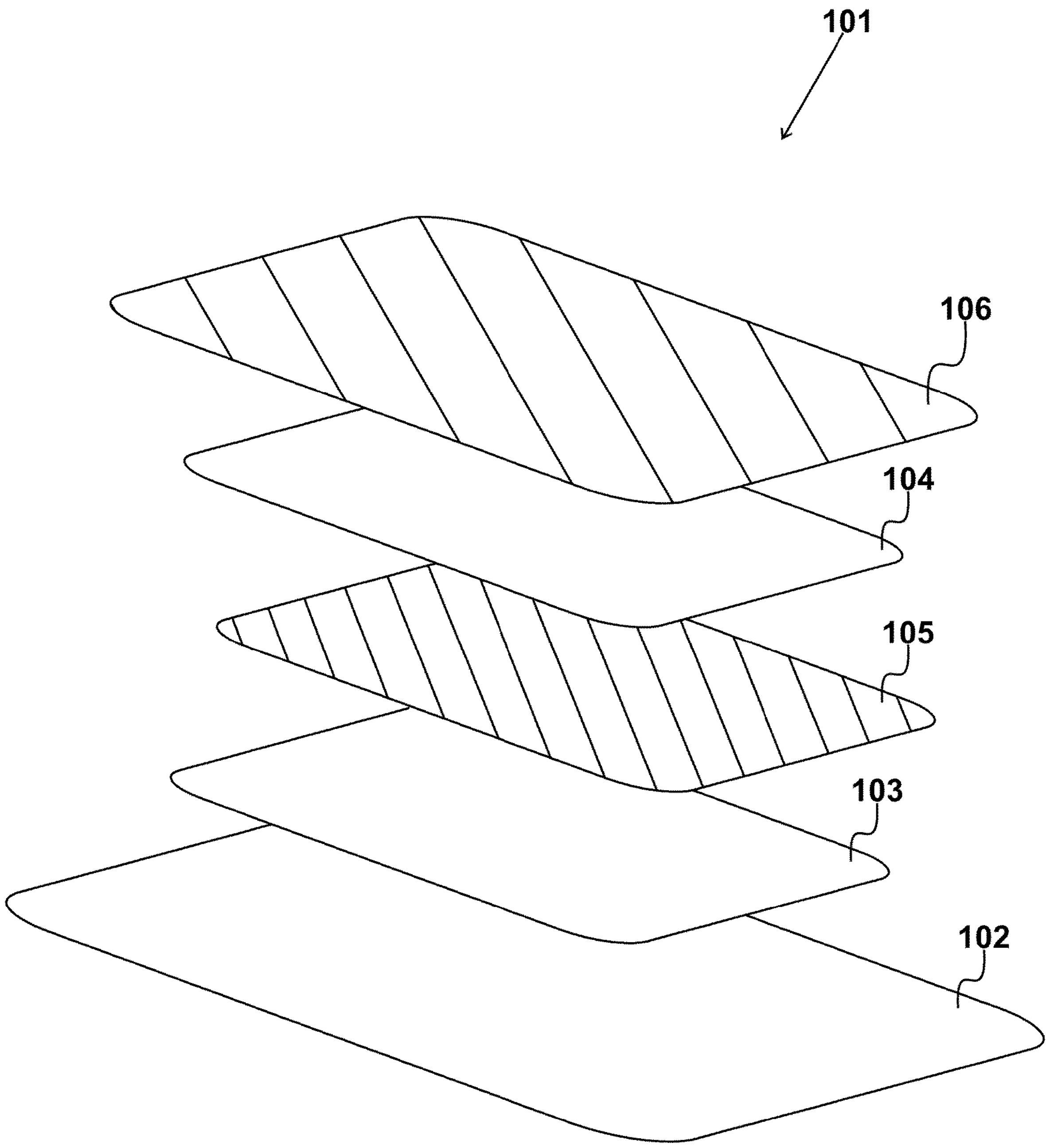
FIG. 1 shows a conductive transfer comprising a plurality of layers.

A conductive transfer in accordance with the present invention is shown in FIG. 1. Conductive transfer 101 comprises a plurality of layers which provide electrical functionality and which can be utilised to form part of an electrical circuit.

In the embodiment, conductive transfer 101 comprises a release film 102 onto which the remaining layers may be printed thereon. In the embodiment, conductive transfer 101 comprises a first non-conductive ink layer 103 and a second non-conductive ink layer 104. Positioned between first non-conductive ink layer 103 and second non-conductive ink layer 104 is an electrically conductive ink layer 105 which is encapsulated by non-conductive ink layers 103 and 104.

An adhesive layer 106 is further provided to enable the conductive transfer 101 to be transferred from release film 102 to a substrate comprising a thermoplastic polymer in accordance with the invention. It is appreciated that, in further embodiments conductive transfer 101 may be transferred to any other suitable flexible or stretchable substrate that would not typically survive the traditional manufacturing process. In an embodiment, this includes alternative substrates such as substrates comprising a paper-based material or another material damageable by repeated curing processes.

In the embodiment, non-conductive ink layers 103 and 104 comprise a suitable printing ink which may be a water-based printing ink, an ultraviolet cured printing ink, a solvent-based ink, or a latex printing ink.

In the embodiment, electrically conductive ink layer 105 comprises any suitable conductive ink of any specified resistance and is configured to provide a conductive path on application of an electric current or voltage. In an embodiment, conductive ink 105 comprises a silver-based ink although it is appreciated that any other suitable conductive ink may be utilised depending on the application.

In the embodiment, adhesive layer 106 may comprise a water-based adhesive, a solvent-based adhesive, a printable adhesive, a powder adhesive or any other suitable adhesive which is capable of adhering conductive transfer 101 to a substrate. Typically, adhesive layer 106 comprises a printed adhesive which is substantially transparent.

In the embodiment, release film 102 comprises a polyester film onto which the layers 103, 104, 105, and 106 are printed thereon. Alternatively, release film 102 comprises a paper film or a coated paper film. Release film 102 is configured to be enabled to be removed from the remaining layers of material following an application of heat and/or pressure as will be described further with respect to FIGS. 5 and 6.

It should be noted that the exploded schematic of FIG. 1 illustrates the layers of the conductive transfer in a simplified form. In practice, each of the non-conductive layers 103 and 104 comprise a plurality of printed layers of the same material. This ensures that the non-conductive layers provide a solid layer of a consistent thickness and, typically, in manufacture, several layers will be overprinted to ensure a robust and durable layer. This similarly applies to conductive layer 105 which may comprise several overprinted layers of a silver-based ink to ensure the required conductivity. As will further be seen in the example illustrated in FIGS. 9 and 10, conductive layer 105 may further comprise layers of more than one material to enable increased electrical functionality.

Similarly, it is anticipated that adhesive layer 106 may comprise a plurality of printed layers to form adhesive layer 106.

FIG. 2

Figure 2:
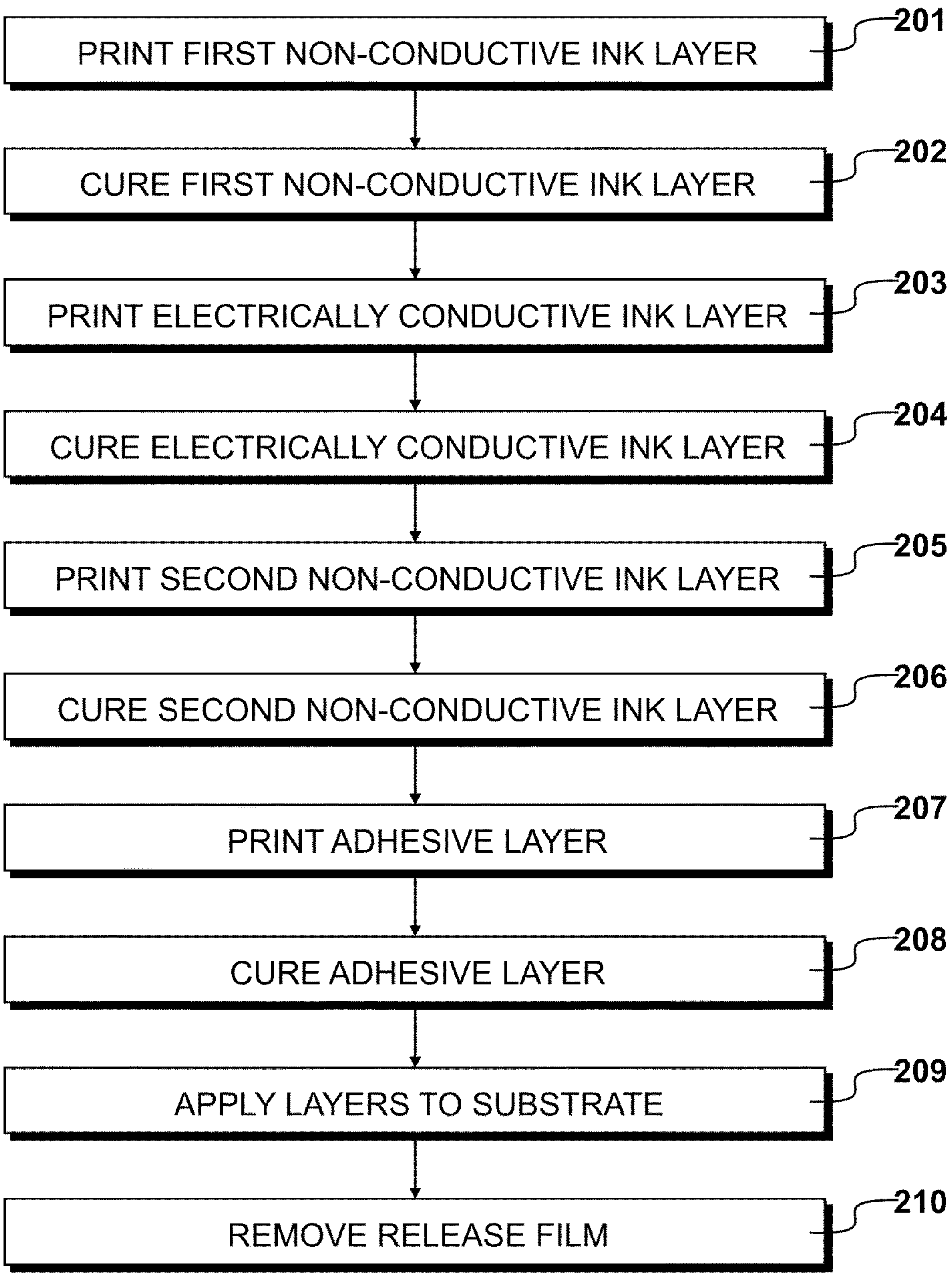
FIG. 2 shows a schematic of a method of manufacturing a conductive transfer.

A schematic of a method of manufacturing the conductive transfer 101 shown previously in FIG. 1 is shown in FIG. 2.

Conductive transfer 101 comprises a first step 201 of printing a non-conductive ink onto release film 102 to produce a first non-conductive ink layer.

Once the first non-conductive ink layer has been printed, non-conductive ink undergoes a curing process at step 202. The curing process ensures that the layers are fully solidified prior to the printing of a further layer thereon. This process will be described further with respect to FIG. 4, however, it is to be appreciated that the step of curing comprises drying the first non-conductive ink layer typically by blowing hot air over the layers by means of a curing machine.

Once the first non-conductive ink layer has been appropriately cured, at step 203, an electrically conductive ink is printed onto the first non-conductive ink layer to produce an electrically conductive ink layer. Similarly, the electrically conductive ink layer is cured at step 204 in a substantially similar manner to the curing of first non-conductive ink layer at step 202.

At step 205, further printing of the non-conductive ink, which may be substantially similar to the non-conductive ink of the first non-conductive ink layer, is printed to form the second non-conductive ink layer at step 205. This is subsequently cured at step 206 in preparation of the printing of an adhesive material over the second non-conductive ink layer to produce an adhesive layer at step 207. At step 208 adhesive layer is cured via the curing machine in a substantially similar manner as described previously.

Thus, by the end of step 208, the plurality of layers have been printed effectively onto the release film 102 and are ready for transfer. At step 209 therefore, the release film to which the non-conductive ink layers, electrically conductive ink layer and adhesive layer are attached thereto is applied to a substrate comprising a thermoplastic polymer. In order to adhere the conductive transfer 101 to the substrate an application of heat and/or pressure is applied to the substrate, the layers and the release film such that adhesive layer 106 adheres to the substrate.

Release film 102 can then be removed from non-conductive ink layer 103 at step 210 by peeling release film 102 from non-conductive ink layer 103. Consequently, the remaining conductive transfer comprising the non-conductive ink layers, electrically conductive ink layer and the adhesive layer are retained on the substrate.

FIG. 3

Figure 3:
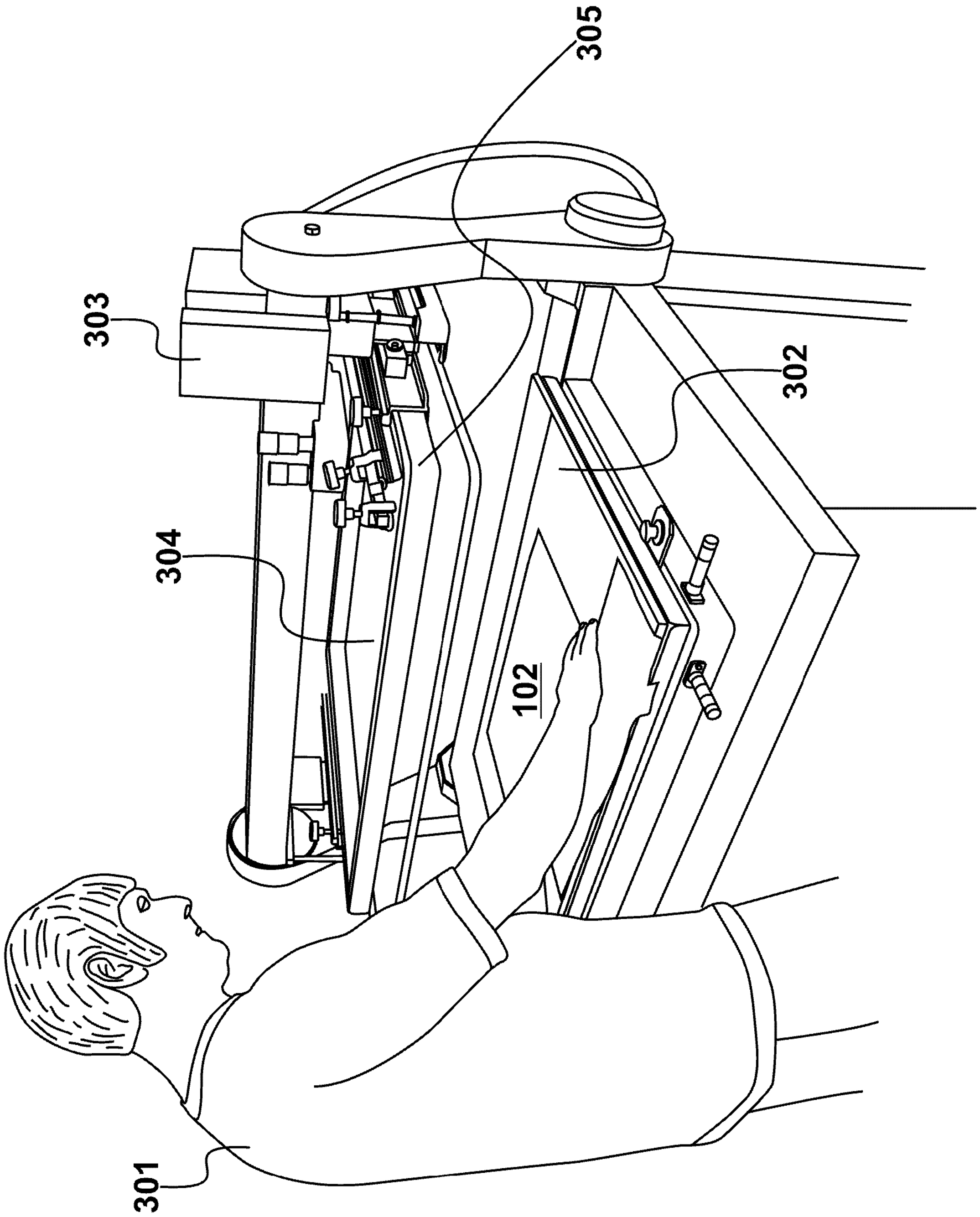
FIG. 3 shows a step of screen-printing in a method of manufacturing a conductive transfer.

An example embodiment of the printing steps for each layer material is shown in FIG. 3. In this illustrated embodiment, FIG. 3 shows a method of a screen-printing process which can be utilised to produce each of the layers.

While this illustrated example shows an example of screen-printing, it is appreciated that alternative methods of printing may be utilised to produce the conductive transfer which involve any one of the following forms of printing: reel to reel printing; dot matrix printing; laser printing; cylinder press printing; inkjet printing; flexographic printing; lithographic printing; offset printing; digital printing; gravure printing; or xerographic printing. It is further appreciated that the invention is not intended to be limited to these specific methods.

In the embodiment, release film 102 is placed by operative 103 onto a surface 302 of a screen-printing machine 303. In the embodiment, release film 102 comprises a sheet of appropriate film which is positioned to be aligned with the screen-printing stencil 304. Once positioned, the screen 305 onto which stencil 304 sits, can be lowered such that the required ink may be released onto release film 102 and printed in the appropriate design or pattern corresponding to that of the stencil 304.

It is noted that for each printing step in the method shown in FIG. 2, release film 102 may initially be free of ink, however, with further steps of printing release film 102 will comprise additional layers of ink depending on the stage in the process.

FIG. 4

Figure 4:
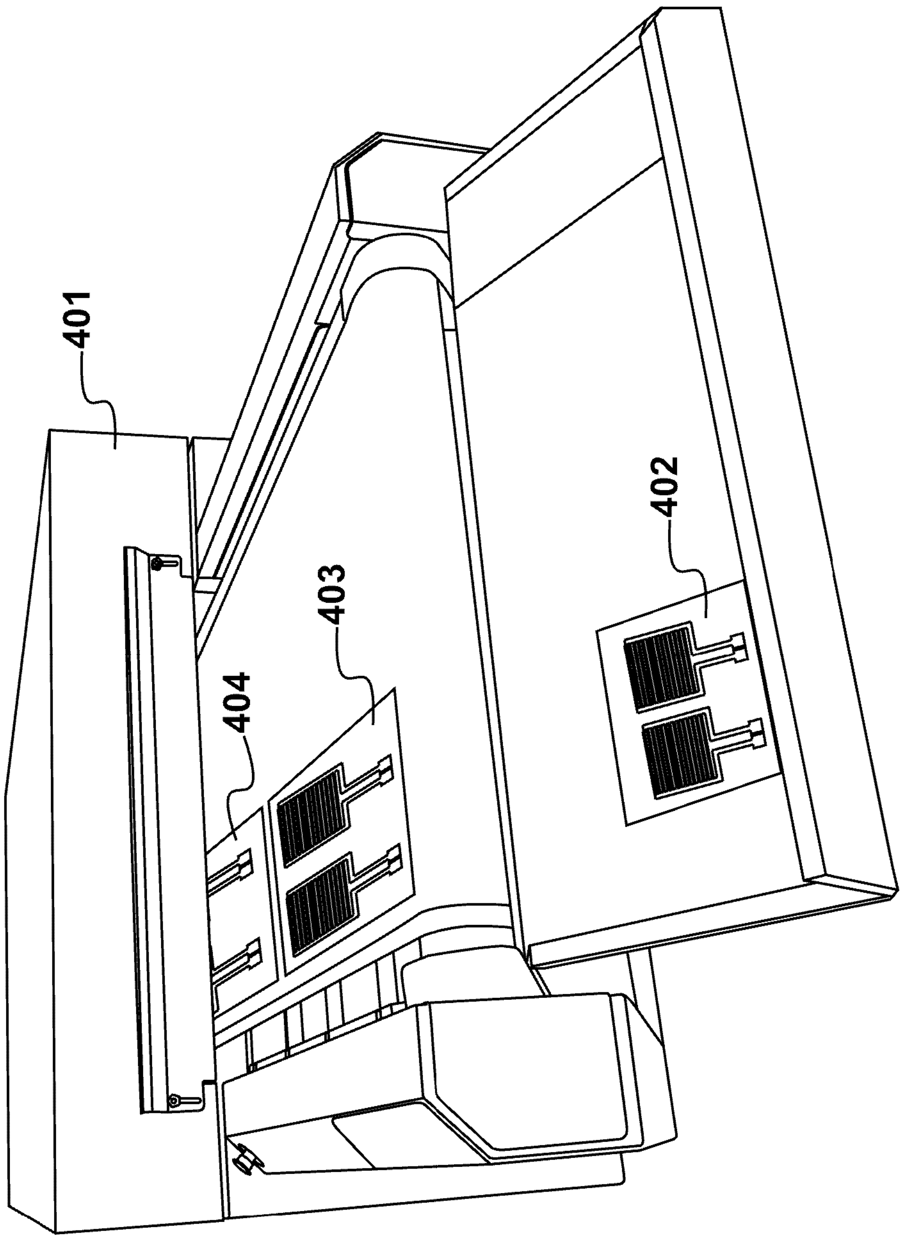
FIG. 4 shows a step of curing in a method of manufacturing a conductive transfer.

Following the printing of each layer, the release film, which includes at least one printed layer, is then processed by means of a curing machine 401 as depicted in FIG. 4. In the embodiment, curing machine 401 comprises a dryer which provides a hot air flow onto sheets 402, 403 and 404 such that any printed layers can be cured effectively and the respective inks appropriately dried.

In the embodiment, the blown air temperature inside the dryer of the curing machine for a worn is often between around one hundred and twenty degrees Celsius and one hundred and fifty degrees Celsius (120° C. and 150° C.). Consequently, it is appreciated that if the printed ink layers were printed directly onto a substrate comprising a thermoplastic polymer, this would have a significant effect on the quality of the substrate. Thus, the release film is provided of an alternative material to ensure the curing process can be conducted effectively and repeatedly even in the cases of complex conductive transfers in which several layers including layers with a plurality of overprint are required.

The curing process is important as, to ensure effective electrical circuits in many applications, it is important to avoid cross-contamination of the layers particularly those between the non-conductive ink layers and the electrically conductive ink layer.

FIG. 5

Figure 5:
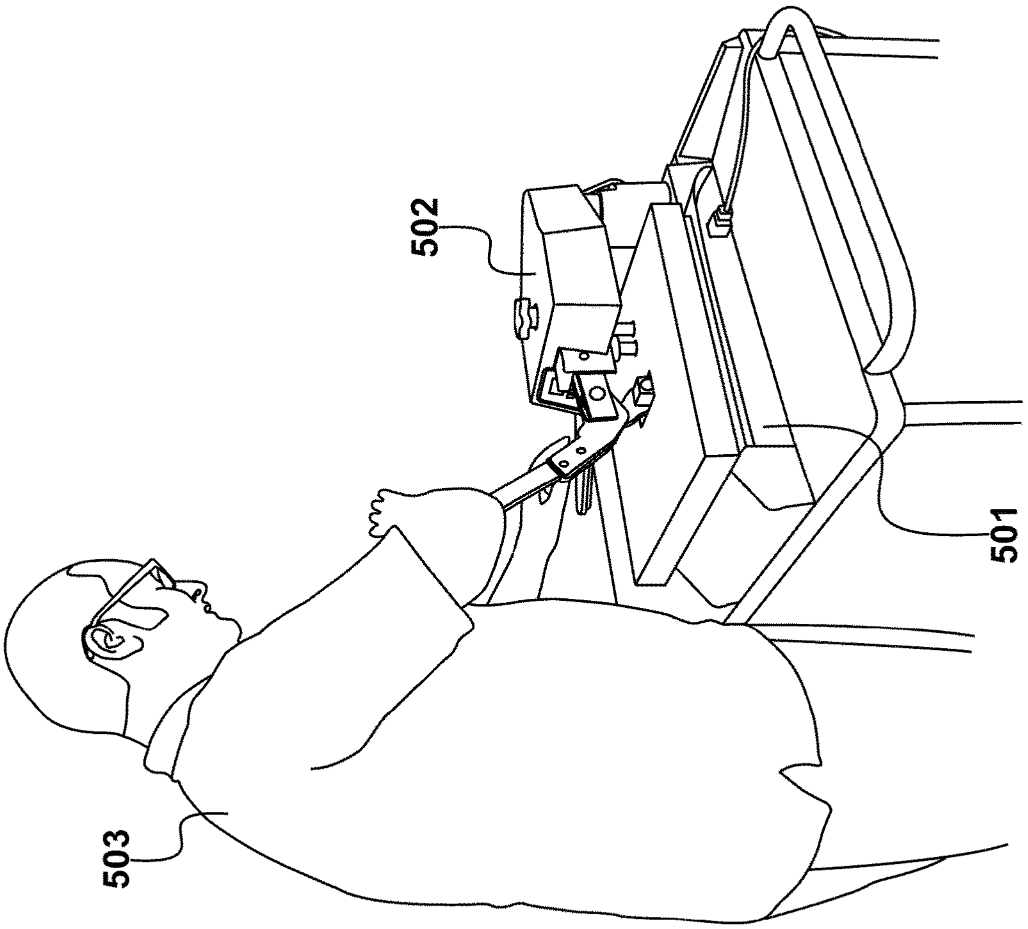
FIG. 5 shows a step of heat pressing a conductive transfer to a substrate comprising a thermoplastic polymer.

A step of applying the release film comprising the first non-conductive ink layer, electrically conductive ink layer, second non-conductive ink layer and the adhesive layer to a substrate is shown in FIG. 5.

The release film comprising the conductive transfer is positioned on a lower plate 501 of a heat press 502. A substrate comprising a thermoplastic polymer is also positioned on the plate 501 of the heat press 502 such that the conductive transfer is positioned appropriately in relation to the substrate.

Once aligned, an operative 503 activates heat press 502 to provide heat and pressure to the conductive transfer to enable release and removal of the release film and, the addition of the conductive transfer to the thermoplastic polymer substrate. In this way, the adhesive layer adheres to the thermoplastic polymer substrate.

In an embodiment, the heat press applies a pressure substantially within a range of one hundred and forty-five and one hundred and eighty degrees Celsius (145° C. to 180° C.). This temperature may vary dependent on the type of heat press utilised however, it is appreciated that in the method of manufacture described herein, this is the only application of heat and pressure for which the thermoplastic polymer substrate is required to withstand.

FIG. 6

Figure 6:
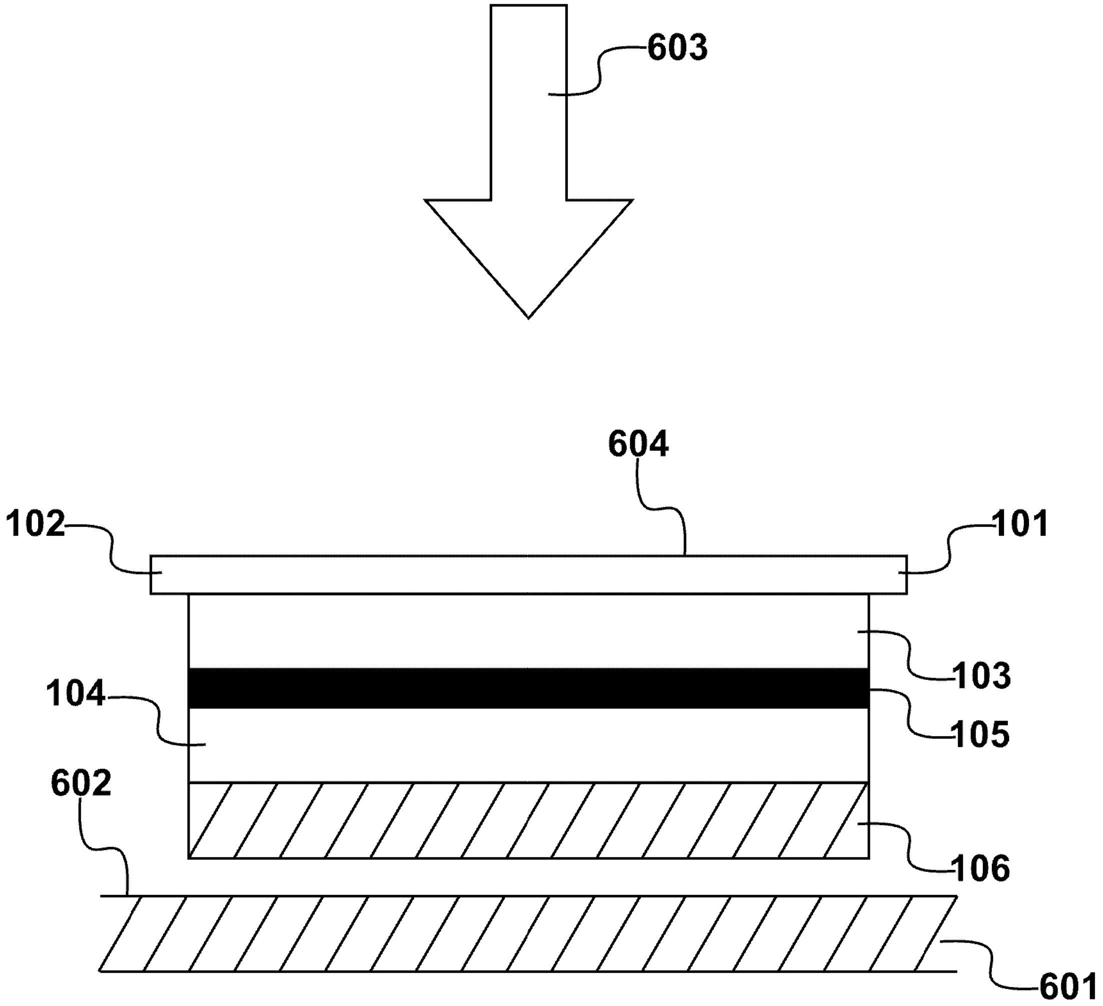
FIG. 6 shows a cross-sectional schematic view of a conductive transfer undergoing the step shown in FIG. 5.

A cross-sectional schematic view of conductive transfer 101 being applied to a first substrate in line with the method previously described with respect to FIG. 5 is shown in FIG. 6.

Conductive transfer 101 is shown comprising first non-conductive ink layer 103, second non-conductive ink layer 104 and electrically conductive ink layer 105. Conductive transfer 101 further comprises adhesive layer 106. Each of the layers are shown attached to release film 102.

In the embodiment of FIG. 6, a substrate 601 is shown such that conductive transfer 101 can be transferred to substrate 601. Thus, conductive transfer 101 is positioned such that adhesive layer 106 is placed in contact with substrate 601 with release film 102 being positioned furthest away from a top surface 602 of substrate 601. In accordance with the method described herein an application of heat and/or pressure is applied to a top surface 604 of conductive transfer 101 which corresponds with the top surface of release film 102. Thus, as adhesive layer 106 is brought into contact with surface 602 and heat and pressure 603 is applied, adhesive layer 106 responds to heat and pressure 603 and adheres to substrate 601.

Subsequently, release film 102 can be removed from conductive transfer 101 by peeling away release film 102 from non-conductive ink layer 103. In this way, transfer 101 becomes attached to substrate 601.

In the embodiment, substrate 601 comprises a thermoplastic polymer. In an embodiment, the thermoplastic polymer comprises a thermoplastic polyurethane (TPU). In an alternative embodiment, the thermoplastic polymer comprises polycarbonate. Thus, the process described herein enables the conductive transfer to be provided with a thermoplastic polymer substrate which can be incorporated into more complex articles such as those described with respect to FIGS. 8 to 12.

FIG. 7

Conductive transfer 101 may further be combined with a second substrate 701 in addition to substrate 601. In the embodiment, substrate 701 is substantially similar to substrate 601 and comprises a thermoplastic polymer as previously described.

In the embodiment, substrate 701 is attached to conductive transfer 101 such that conductive transfer 101 is positioned between first substrate 601 and second substrate 701. In this way, substrates 601 and 701 encapsulate conductive transfer 101 providing a first outer surface 702 and a second outer surface 703. The nature of the outer surfaces 702 and 703 are dependent on the thermoplastic polymer and the nature of its material.

As indicated previously, in an embodiment, thermoplastic polymer substrates 601 and 701 may comprise thermoplastic polyurethane (TPU) or polycarbonate. In use, these materials provide a number of advantages when being utilised in combination with conductive transfers which are suitable for many applications. For example, TPU provides a solid wipeable and washable surface such that the outer surfaces 702 and 703 can easily be cleaned while, in addition, also provide protection to conductive transfer 101 which, in the embodiment, is contained therein. In addition, the outer surfaces 702 and 703 present a robust solid surface which is also substantially transparent which provides an additional advantage in terms of incorporating the conductive transfer into practical applications.

For example, in an embodiment, at least one of the substrates 601 and 701 comprises a printed graphical element. Such a printed graphical element can be positioned between substrate 601 and substrate 701 outside conductive transfer 101 such that the printed graphical element can be viewed from the outer surface(s) 702 and/or 703. In an example embodiment, in automotive applications, this may be suitable to create a desirable finish to a dashboard in a vehicle.

FIG. 8

Figure 8:
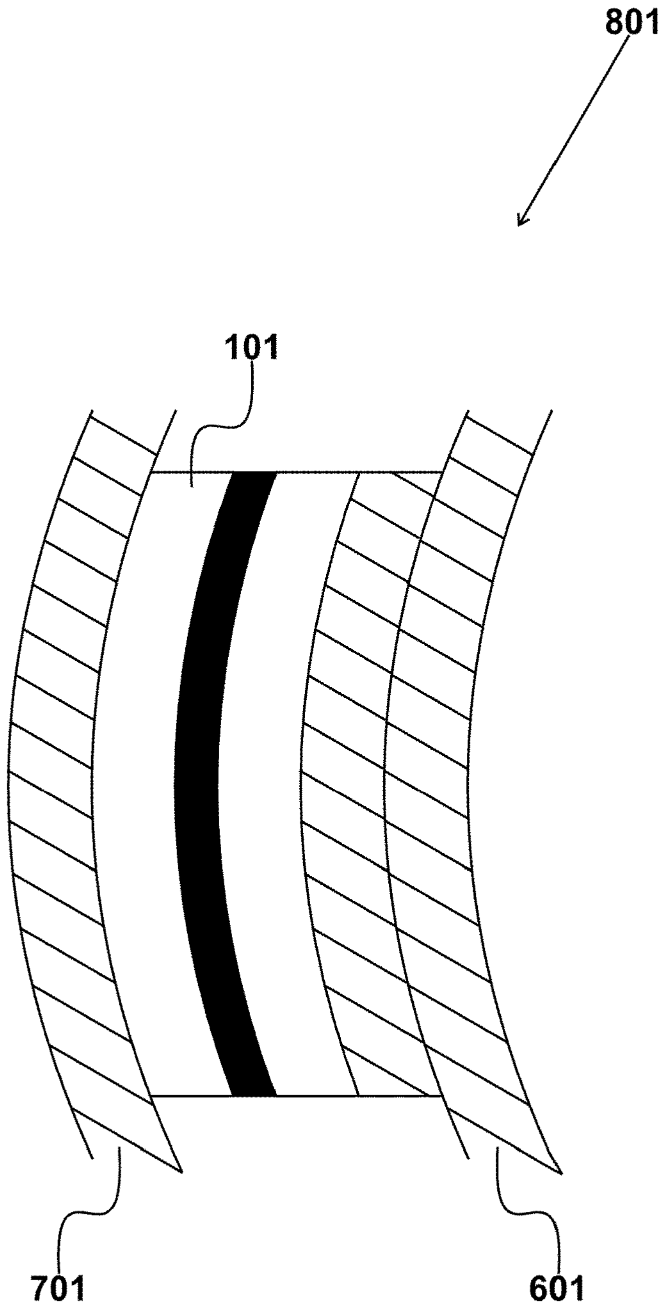
FIG. 8 shows a cross-sectional schematic view of the conductive transfer of FIG. 7, having been formed into a curved article.

In an embodiment, conductive transfer 101 in combination with substrates 601 and 701 can be adapted to produce a curved article 801 as shown in FIG. 8.

In the embodiment, an application of heat and pressure is applied to substrates 601 and 701 and, taking advantage of the thermoplastic properties of the thermoplastic polymer substrate, substrates 601 and 701 can be shaped into curved article 801.

Conductive transfer 101 is thin enough and flexible enough to ensure that it forms a radius of curvature in line with the curved substrates 601 and 701, thus allowing for a conductive transfer to be utilised in curved applications. Again, one such example would be in automotive applications and could be utilised, for example, to provide a functional dashboard surface in an automotive vehicle or similar.

In order to obtain a curved article from conductive transfer 101 and substrates 601 and 701, a process utilising injection moulding and high pressure forming can be conducted. The high pressure forming involves an application of high pressure and heat and in which substrates 601 and 701 are bonded together and curved into an appropriate moulding. This process allows for in-mould electronics to be produced.

Such a moulding can be provided as an interior or exterior moulding on an automotive vehicle, for example.

FIG. 9

Figure 9:
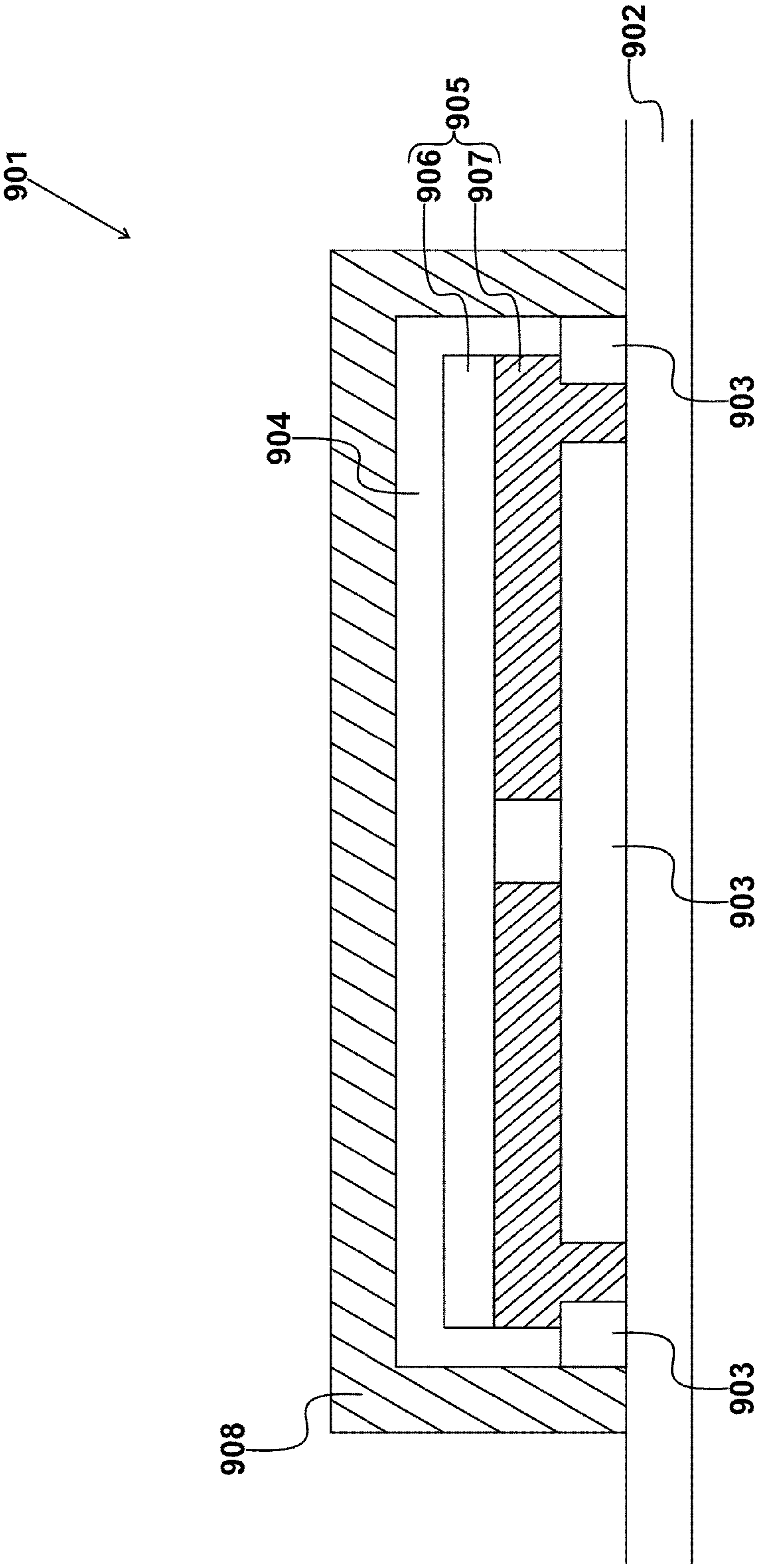
FIG. 9 shows a cross-sectional schematic of an example heated conductive transfer.
Figure 10:
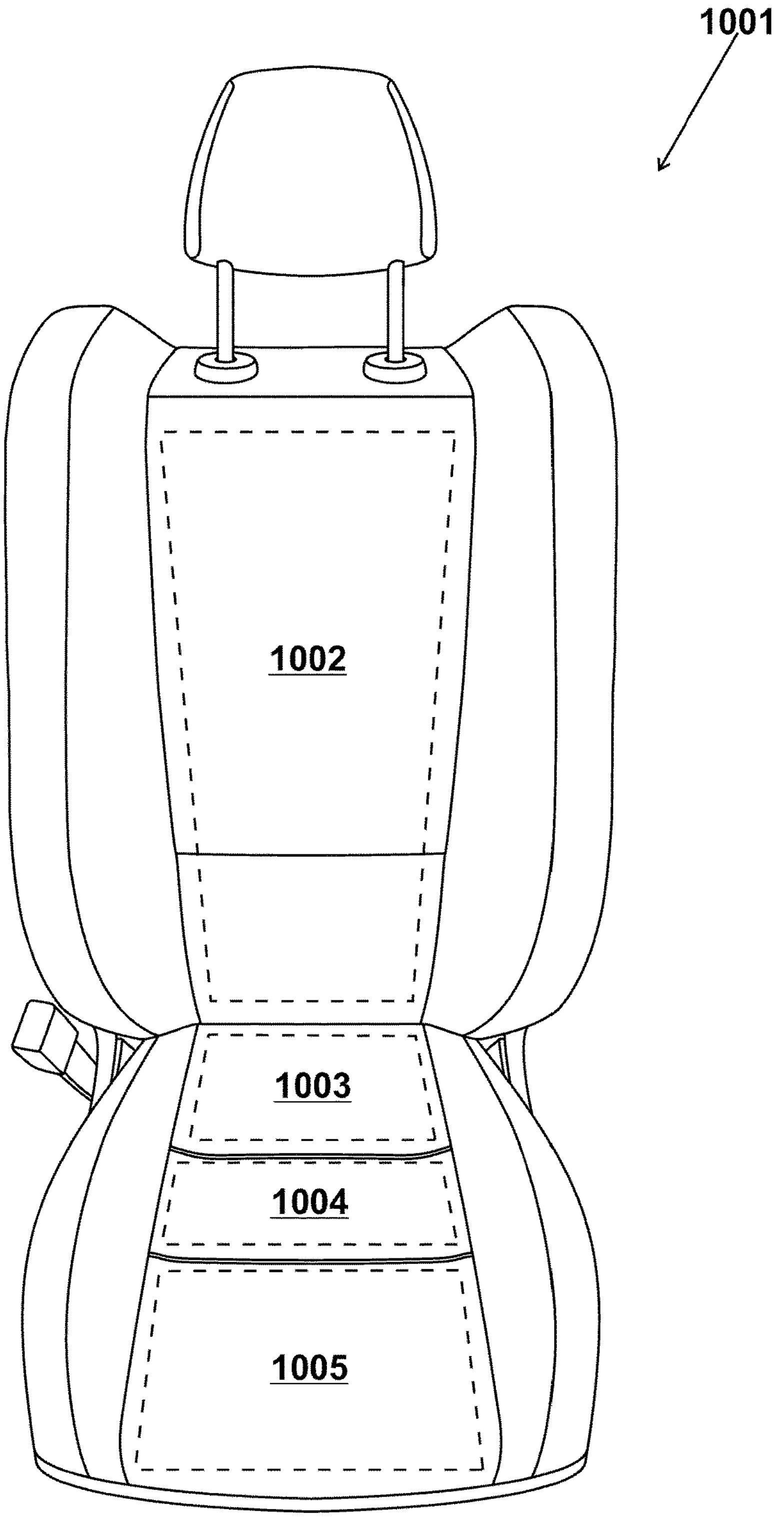
FIG. 10 shows a vehicle seat comprising a heated conductive transfer.

A cross-sectional schematic view of an example conductive transfer configured to provide a heating element is shown in FIG. 9.

As shown, conductive transfer 901 comprises release film 902, first non-conductive ink layer 903, and second non-conductive ink layer 904. In the embodiment, conductive transfer 901 further comprises conductive ink layer 905 which forms a heating element and utilises an electrically conductive ink having a positive temperature coefficient such that the electrically conductive ink exhibits an increase in resistance in response to an increase in temperature.

In the embodiment, heating element 905 is comprised of the first electrically conductive ink layer 906 which comprises an electrically conductive ink having a positive temperature coefficient. In addition, the electrically conductive ink layer 907 comprises a further metallic material, such as a silver-based ink. Conductive transfer 901 further comprises an adhesive layer 908 which enables conductive transfer 901 to be adhered to a thermoplastic polymer substrate.

Thus, it should be appreciated that in the embodiment, conductive transfer 901 with heating element 905 introduces a more complex arrangement of conductive layers which requires additional stages of curing that would damage a thermoplastic polymer substrate should the inks be printed directly onto that substrate.

FIG. 10

A heated conductive transfer such as that described in FIG. 9 can be utilised in an application to provide a heated seat.

Heated seat 1001 comprises a plurality of conductive transfers 1002, 1003, 1004 and 1005. Such heated conductive transfers are able to be incorporated into a seat for an automotive vehicle and may also, due to the properties of the thermoplastic polymer substrate, provide a wipeable, easy to clean surface on top of the seat. This may be particularly desirable for children's seating, for example, where spillages may occur.

FIG. 11

Figure 11:
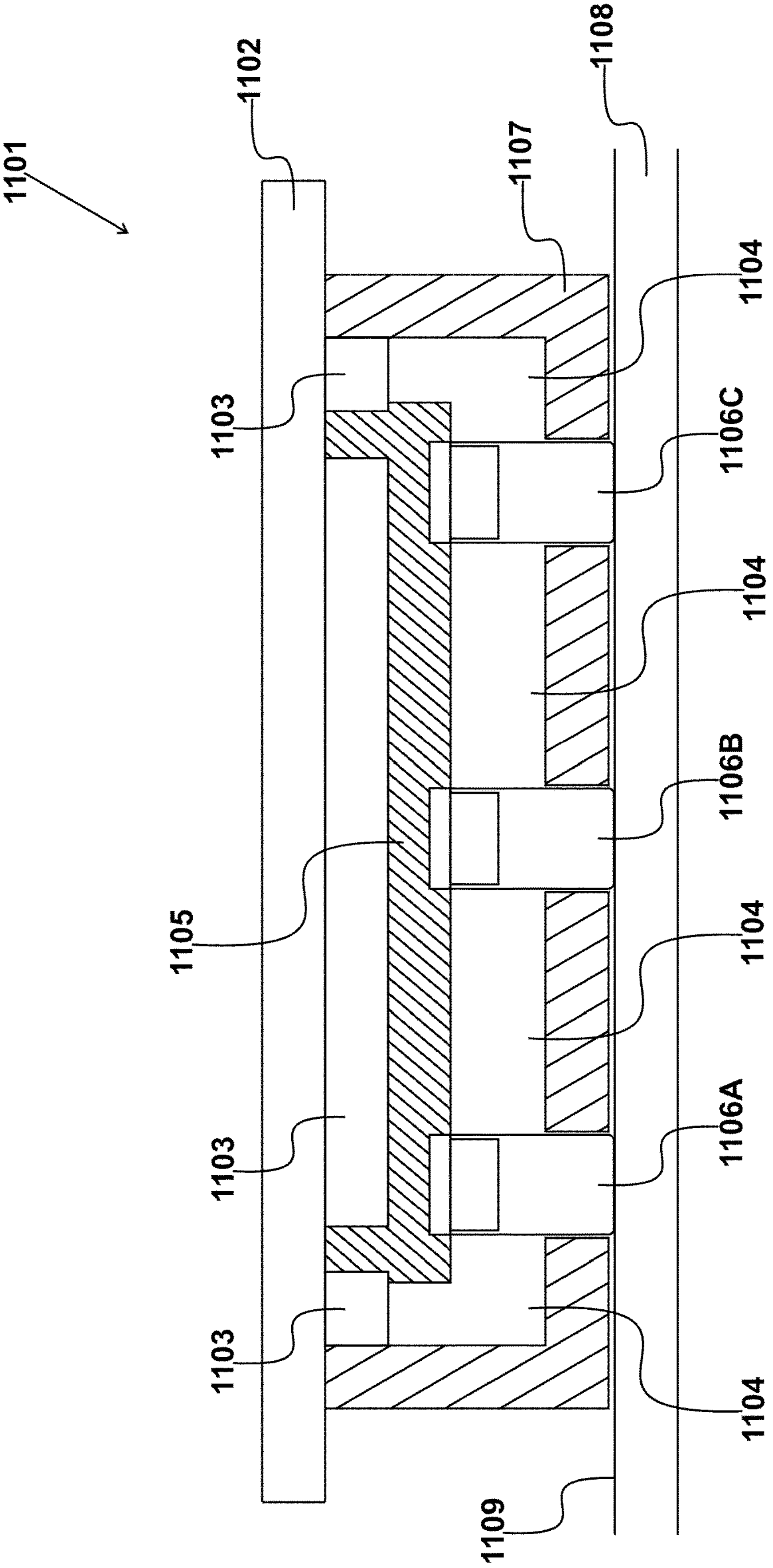
FIG. 11 shows a cross-sectional schematic of an example conductive transfer comprising an electrical component.

A cross-sectional schematic view of a further example embodiment of a conductive transfer 1101 in accordance with the present invention is shown in FIG. 11.

Conductive transfer 1101 illustrates a conductive transfer comprising a release film 1102, a first non-conductive ink layer 1103 and a second non-conductive ink layer 1104. Between first non-conductive ink layer 1103 and second non-conductive ink layer 1104 is electrically conductive ink layer 1105.

In the embodiment, a plurality of electrical components 1106 are provided in contact with electrically conductive ink layer 1105.

In the embodiment, electrical components 1106 comprise an illuminating device such as a light-emitting diode (LED). Illuminating devices 1106 are positioned in contact with electrically conductive ink layer 1105 and extend through non-conductive ink layer 1104 and adhesive layer 1107.

In the embodiment, conductive transfer 1101 is attached to thermoplastic polymer substrate 1108. As shown, electrical components 1106 are in contact with an inner surface 1109 of substrate 1108.

As noted previously, one of the advantages of thermoplastic polymer materials is that these may be substantially transparent in nature. Consequently, in embodiments where the electrical components 1106 are illuminating devices, the transparent nature of substrate 1108 is particularly beneficial in ensuring that the illuminating devices are effectively seen in their application. At the same time, the harder substrate 1108 also provides additional protection to electronic components 1106 that is not true of other previously known substrates such as fabrics or flexible films.

In alternative embodiments, it is appreciated that the electrical components may be any other suitable electrical component. In one example embodiment, the electrical component comprises an audio device which is configured to emit an audible signal, for example, when conductive transfer 1101 is touched. In a further embodiment, conductive transfer 1101 is configured to provide both an illuminating device and an audio response in response to a touch from a user.

FIG. 12

Figure 12:
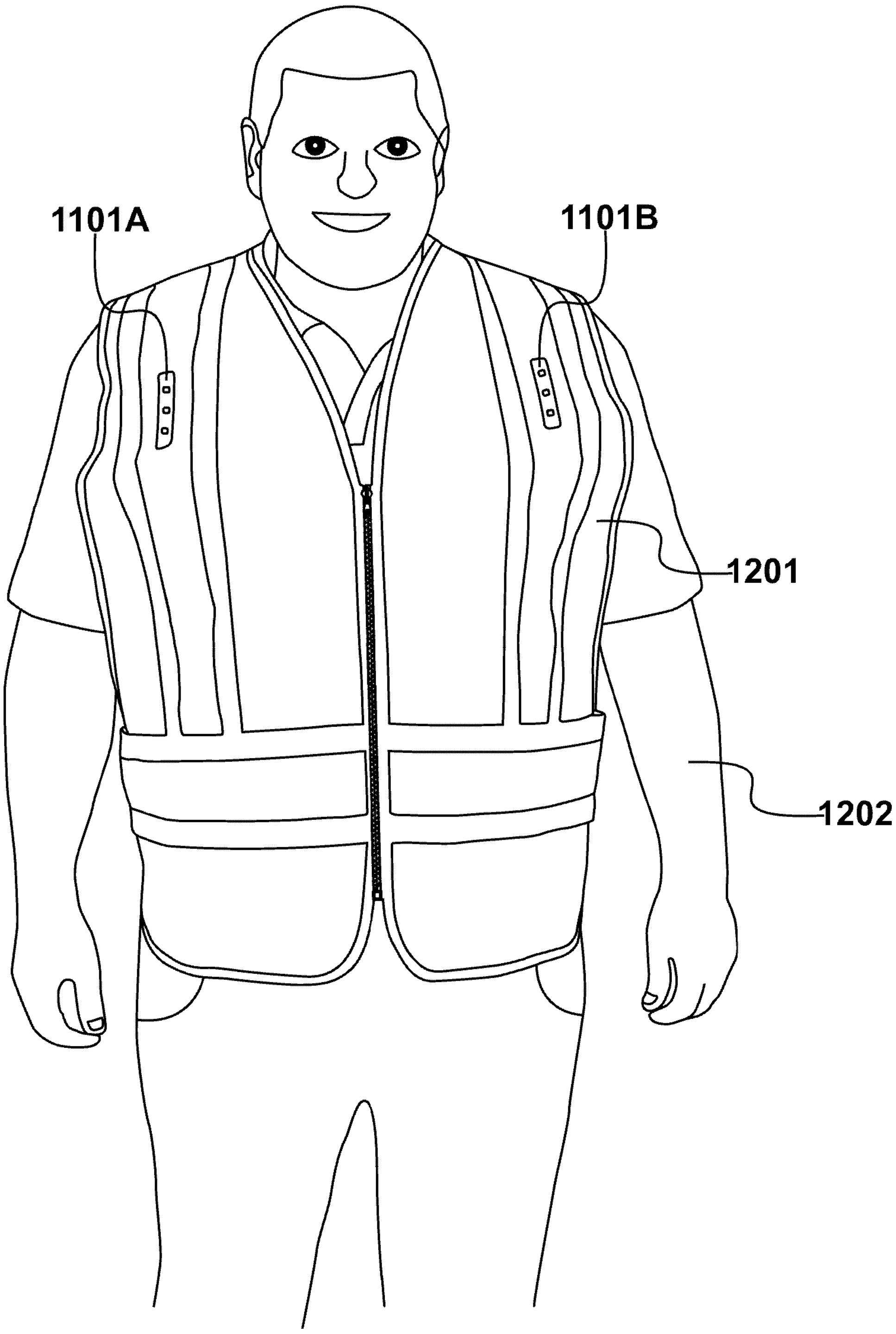
FIG. 12 shows a wearable item incorporating a conductive transfer comprising an electrical component.

Conductive transfer 1101 may therefore be incorporated into a wearable item 1201. In the embodiment of FIG. 12, wearable item 1201 is shown as a high-visibility jacket worn by an operative 1202. Wearable item 1201 comprises a plurality of conductive transfers 1101 which comprise illuminating devices 1106 as described previously in FIG. 11.

Due to the properties of substrate 1108, the brightness of the illuminating devices is increased compared to previously known substrates. In addition, the washable and wipeable nature of the thermoplastic polymer surface means that this part of the wearable item 1201 can be effectively cleaned between uses.

Further, substrate 1108 further acts to provide additional protection to conductive transfer 1101 when wearable item 1201 is washed. Consequently, wearable item 1201 can be subjected to conventional washing practices such as use in conventional washing machine while ensuring that the electrical components and conductive elements within the conductive transfer are adequately protected by means of substrate 1108.

Figure 7:
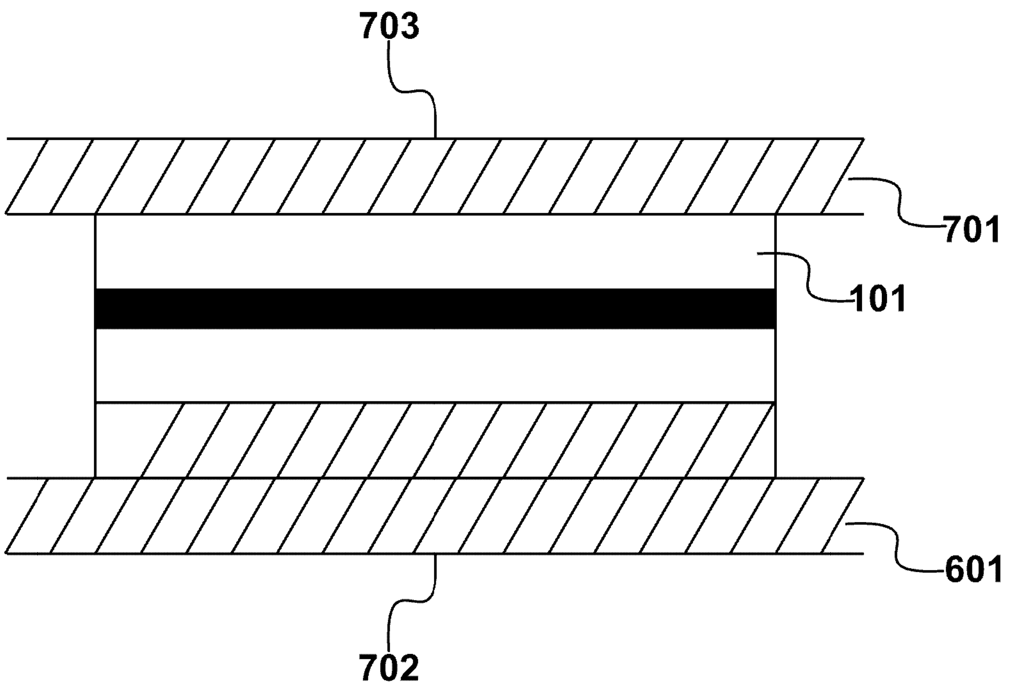
FIG. 7 shows a cross-sectional schematic view of a conductive transfer comprising first and second substrates.

It is further appreciated that this advantage could be emphasised further by the inclusion of a second substrate in this embodiment in a substantially similar manner to that previously described in FIG. 7. This is true irrespective of whether the conductive transfer 1101 is required to be curved or otherwise.

The invention claimed is:

1. A method of manufacturing a conductive transfer, the method comprising:

printing non-conductive ink onto a release film to produce a first non-conductive ink layer;

printing an electrically conductive ink onto said first non-conductive ink layer to produce an electrically conductive ink layer;

printing non-conductive ink over said electrically conductive ink layer to produce a second non-conductive ink layer;

depositing an adhesive material over said second non-conductive ink layer to produce an adhesive layer;

placing said adhesive layer in contact with a first substrate that comprises a thermoplastic polymer, said adhesive layer being coupled to said first non-conductive ink layer, said electrically conductive ink layer, and said second non-conductive ink layer when said adhesive layer is placed in contact with said first substrate;

after placing said adhesive layer in contact with said first substrate, applying at least one of heat or pressure to said release film such that said adhesive layer adheres to said first substrate such that said first substrate provides an outer surface of said conductive transfer; and after applying said at least one of heat or pressure to said release film, removing said release film, wherein after removing said release film and after said adhesive layer is adhered to said first substrate, said conductive transfer comprising said first substrate is incorporated into a complex article or wearable item, the method further comprising, after removing said release film, injection moulding said conductive transfer.

2. The method of claim 1, wherein said thermoplastic polymer comprises thermoplastic polyurethane or polycarbonate.

3. The method of claim 1, wherein said first substrate is substantially transparent.

4. The method of claim 1, wherein each said step of printing comprises one or more of the following: screen-printing; reel-to-reel printing; dot matrix printing; laser printing; cylinder press printing; ink jet printing; flexographic printing; lithographic printing; offset printing; digital printing; gravure printing; and xerographic printing.

5. The method of claim 1, wherein each said step of curing comprises drying each said layer.

6. The method of claim 1, wherein the printing the electrically conductive ink comprises:

producing a heating element from said electrically conductive ink, said electrically conductive ink having a positive temperature coefficient such that said electrically conductive ink exhibits an increase in resistance in response to an increase in temperature.

7. The method of claim 1, further comprising attaching an electrical component in contact with said electrically conductive ink layer.

8. The method of claim 7, wherein said electrical component comprises an illuminating device or an audio device.

9. A method of manufacturing a conductive transfer, said method comprising:

printing non-conductive ink onto a release film to produce a first non-conductive ink layer;

printing an electrically conductive ink onto said first non-conductive ink layer to produce an electrically conductive ink layer;

printing non-conductive ink over said electrically conductive ink layer to produce a second non-conductive ink layer;

depositing an adhesive material over said second non-conductive ink layer to produce an adhesive layer;

placing said adhesive layer in contact with a first substrate that comprises a thermoplastic polymer, said adhesive layer being coupled to said first non-conductive ink layer, said electrically conductive ink layer, and said second non-conductive ink layer when said adhesive layer is placed in contact with said first substrate;

after placing said adhesive layer in contact with said first substrate, applying at least one of heat or pressure to said release film such that said adhesive layer adheres to said first substrate such that said first substrate provides an outer surface of said conductive transfer;

after applying said at least one of heat or pressure to said release film, removing said release film, wherein after removing said release film and after said adhesive layer is adhered to said first substrate, said conductive transfer comprising said first substrate is incorporated into a complex article or wearable item, the method further comprising attaching a second substrate comprising a thermoplastic polymer to said conductive transfer.

10. The method of claim 9, further comprising:

applying heat and pressure to said first substrate and said second substrate; and shaping said first substrate and said second substrate into a curved article.

11. The method of claim 9, wherein at least one of said first substrate or said second substrate comprises a printed graphical element.

12. A method of manufacturing a conductive transfer, the method comprising:

forming a layered structure, wherein the forming said layered structure includes:

obtaining a release film;

printing non-conductive ink onto said release film to produce a first layer;

printing electrically conductive ink onto said first layer to produce an electrically conductive ink layer;

printing non-conductive ink over said electrically conductive ink layer to produce a second layer; and depositing an adhesive material over said second layer to produce an adhesive layer;

after forming the layered structure, placing said adhesive layer of said layered structure in contact with a substrate that comprises a thermoplastic polymer;

after placing said adhesive layer in contact with said substrate, treating said release film with at least one physical stimulus such that said adhesive layer adheres to said substrate, said substrate providing an outer surface of said conductive transfer; and after treating said release film with said at least one physical stimulus, removing said release film, wherein after removing said release film, said conductive transfer is incorporated into a complex article or wearable item, further comprising, after removing said release film, injection moulding said conductive transfer.

13. The method of claim 12, wherein said thermoplastic polymer comprises thermoplastic polyurethane or polycarbonate.

14. The method of claim 12, wherein said substrate is substantially transparent.

15. The method of claim 12, wherein each said step of printing comprises one or more of the following: screen-printing; reel-to-reel printing; dot matrix printing; laser printing; cylinder press printing; ink jet printing; flexographic printing; lithographic printing; offset printing; digital printing; gravure printing; and xerographic printing.

16. A method of manufacturing a conductive transfer, said method comprising:

forming a layered structure, wherein said forming said layered structure includes:

printing non-conductive ink onto a release film to produce a first layer;

printing electrically conductive ink onto said first layer to produce an electrically conductive ink layer;

printing non-conductive ink over said electrically conductive ink layer to produce a second layer; and depositing an adhesive material over said second layer to produce an adhesive layer;

after forming said layered structure, placing said adhesive layer of said layered structure in contact with a substrate that comprises a thermoplastic polymer;

after placing said adhesive layer in contact with said substrate, treating said release film with at least one physical stimulus such that said adhesive layer adheres to said substrate, said substrate providing an outer surface of said conductive transfer; and after treating said release film with said at least one physical stimulus, removing said release film, wherein after removing said release film, said conductive transfer is incorporated into a complex article or wearable item, the method further comprising attaching a second substrate comprising a thermoplastic polymer to said conductive transfer.

17. The method of claim 16, further comprising:

applying heat and pressure to said substrate and said second substrate; and shaping said substrate and said second substrate into a curved article.

18. The method of claim 16, wherein at least one of said substrate or said second substrate comprises a printed graphical element.

* * * * *